United States Patent
Ohyama (10) Patent No.: US 11,187,537 B2
(45) Date of Patent: Nov. 30, 2021

(54) TRAVELLING DIRECTION CALCULATION APPARATUS, TRAVELLING DIRECTION DECISION METHOD, AND NON-TRANSITORY COMPUTER READABLE MEDIUM

(71) Applicant: SHARP KABUSHIKI KAISHA, Sakai (JP)

(72) Inventor: Shigeo Ohyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 281 days.

(21) Appl. No.: 16/390,619

(22) Filed: Apr. 22, 2019

(65) Prior Publication Data
US 2019/0323840 A1    Oct. 24, 2019

(30) Foreign Application Priority Data
Apr. 23, 2018 (JP) .............................. JP2018-082300

(51) Int. Cl.
*G01C 21/18* (2006.01)
*G01C 23/00* (2006.01)
(Continued)

(52) U.S. Cl.
CPC .............. *G01C 21/18* (2013.01); *G01C 19/02* (2013.01); *G01C 23/00* (2013.01); *G01P 13/045* (2013.01); *G01P 15/08* (2013.01)

(58) Field of Classification Search
CPC ......... A61B 1/00; A61B 1/0266; A61B 1/027; A61B 2220/00; A61B 2220/10;
(Continued)

(56) References Cited

U.S. PATENT DOCUMENTS

2008/0249736 A1 * 10/2008 Prstojevich ........ A63B 24/0062
                                                      702/141
2009/0143972 A1    6/2009 Kitamura et al.
(Continued)

FOREIGN PATENT DOCUMENTS

JP    2009-186376 A    8/2009
JP    2012-021870 A    2/2012
(Continued)

*Primary Examiner* — Anthony R Jimenez
(74) *Attorney, Agent, or Firm* — ScienBiziP, P.C.

(57) ABSTRACT

A travelling direction calculation apparatus includes an acceleration sensor, a period identification unit, an action determination unit, a vector calculator, and a travelling direction decision unit. The period identification unit identifies a stable measurement period and an idling leg period based on change in a vertical component of acceleration detected by the acceleration sensor. The action determination unit discriminates between walking and running by using the minimum value of the vertical component of the acceleration in the idling leg period. The vector calculator calculates a velocity vector from a horizontal component of the acceleration in the stable measurement period. The travelling direction decision unit decides a direction of traveling of a user based on a result of determination performed by the action determination unit and the velocity vector calculated by the vector calculator.

19 Claims, 7 Drawing Sheets

(51) Int. Cl.
  *G01P 15/08* (2006.01)
  *G01P 13/04* (2006.01)
  *G01C 19/02* (2006.01)

(58) Field of Classification Search
  CPC ............ A61B 2220/12; A61B 2220/13; A61B 2220/17; A61B 2220/18; A61B 2220/20; A61B 2220/22; A61B 2220/24; A61B 2220/30; A61B 2220/31; A61B 2220/34; A61B 2220/36; A61B 2220/40; A61B 2220/44; A61B 2220/50; A61B 2220/51; A61B 2220/53; A61B 2220/62; A61B 2220/64; A61B 69/00; A61B 69/0028; A61B 69/0031; A61B 2208/00; A61B 2208/0204; A61B 2208/0209; A61B 24/00; A61B 24/0003; A61B 24/0006; A61B 24/0009; A61B 24/0012; A61B 24/0015; A61B 24/0021; A61B 24/0037; A61B 24/0043; A61B 24/0062; A61B 24/0068; A61B 24/0071; G01P 13/00; G01P 13/04; G01P 13/045; G01P 15/00; G01P 15/08; G01C 22/006; G01C 21/00; G01C 21/18; G01C 19/00; G01C 19/02; G01C 23/00
  USPC .......................................................... 701/500
  See application file for complete search history.

(56) References Cited

U.S. PATENT DOCUMENTS

2010/0191501 A1\* 7/2010 Kitamura .............. A61B 5/1112
  702/150
2013/0178958 A1\* 7/2013 Kulach ................ A61B 5/6807
  700/91
2013/0204572 A1 8/2013 Sato

FOREIGN PATENT DOCUMENTS

JP 2013-160657 A 8/2013
WO 2006/104140 A1 10/2006

\* cited by examiner

TRAVELLING DIRECTION CALCULATION APPARATUS, TRAVELLING DIRECTION DECISION METHOD, AND NON-TRANSITORY COMPUTER READABLE MEDIUM

BACKGROUND

1. Field

The present disclosure relates to a travelling direction calculation apparatus, a travelling direction decision method, and a non-transitory computer readable medium and, for example, relates to a travelling direction calculation apparatus that decides the direction of the travelling of a user for pedestrian dead reckoning (PDR).

2. Description of the Related Art

A car navigation system or the like using global positioning system (GPS) is implemented for the PDR. However, inside a building, in an underground shopping mall, and in other places where GPS radio waves are not receivable, a target object such as a beacon in place of GPS is desirably installed, and thus provision of infrastructure incurs cost. Hence, there is proposed a PDR that identifies the location of a pedestrian by using the acceleration sensor, the magnetic field sensor, the gyro sensor, and the like of the mobile apparatus of the pedestrian. In the PDR, the travelling direction and a distance of a step taken by the pedestrian are calculated from sensor information, data regarding the location of a moving point per step is accumulated, and thereby a relative location from the start point is calculated.

In particular, weight is attached to a process for calculating the travelling direction, and thus calculation using the following characteristic of a walking motion is proposed. Specifically, a walking motion seems to be composed of approximately uniform motions but is actually composed of repeated motions involved with slowdown in landing of the forward foot on the ground and acceleration applied by pushing off the ground with the rear foot.

Japanese Unexamined Patent Application Publication No. 2009-186376 (published on Aug. 20, 2009) discloses technology by which the travelling direction is selectively decided by combining a gyro sensor and a magnetic field sensor. International Publication No. WO2006/104140 (published on Oct. 5, 2006) discloses technology by which the travelling direction is decided by extracting a frequency component related to walking from the value of an acceleration sensor. Japanese Unexamined Patent Application Publication No. 2012-21870 (published on Feb. 2, 2012) discloses technology by which acceleration axes are estimated by obtaining the distribution of acceleration and thereby the travelling direction is decided. Japanese Unexamined Patent Application Publication No. 2013-160657 (published on Aug. 19, 2013) discloses technology by which the travelling direction is decided by determining a positive or negative direction of horizontal acceleration and by performing integration.

However, according to the technology described in Japanese Unexamined Patent Application Publication No. 2009-186376, only the angle of a turn of a pedestrian is calculated by using the gyro sensor and the magnetic field sensor. Since the pedestrian does not necessarily moves facing forward, a step taken laterally or the like is not detected. The technology described in International Publication No. WO2006/104140 uses data corresponding to several steps that is desirably accumulated for frequency analysis, which leads to a considerably increased memory space of the mobile apparatus and a large number of resources such as the use of a cloud service or the like. Accordingly, it is difficult to provide practical services. The technology described in Japanese Unexamined Patent Application Publication No. 2012-21870 uses a statistical concept in such a manner that the distribution is obtained from all of acceleration data items corresponding to one step. However, the directions of an acceleration component that are related to travelling directions respectively in running and walking are not discriminated. With the technology described in Japanese Unexamined Patent Application Publication No. 2013-160657, the positive or negative direction of the horizontal acceleration is determined, and integration is performed on the acceleration. However, the directions of an acceleration component that are related to travelling directions respectively in running and walking are not discriminated.

It is desirable as an aspect of the present disclosure to provide a travelling direction calculation apparatus and a travelling direction decision method that discriminate between running and walking and can detect a travelling direction with high accuracy.

SUMMARY

According to an aspect of the disclosure, there is provided a travelling direction calculation apparatus including an acceleration sensor, a period identification unit, an action determination unit, a vector calculator, and a travelling direction decision unit. The acceleration sensor detects acceleration in three axial directions occurring on a user. The period identification unit identifies a stable measurement period and an idling leg period based on change in a vertical component of the acceleration detected by the acceleration sensor. The action determination unit discriminates between walking and running by referring to the vertical component of the acceleration in the idling leg period. The vector calculator calculates a velocity vector from a horizontal component of the acceleration in the stable measurement period. The travelling direction decision unit decides a direction of traveling of the user based on a result of determination performed by the action determination unit and the velocity vector calculated by the vector calculator.

According to an aspect of the disclosure, there is provided a travelling direction decision method performed by a travelling direction calculation apparatus including an acceleration sensor that detects acceleration in three axial directions occurring on a user. The method includes period identifying, action determining, vector calculating, and travelling direction deciding. In the period identifying, a stable measurement period and an idling leg period are identified based on change in a vertical component of the acceleration detected by the acceleration sensor. In the action determining, walking and running are discriminated by referring to the vertical component of the acceleration in the idling leg period. In the vector calculating, a velocity vector is calculated from a horizontal component of the acceleration in the stable measurement period. In the travelling direction deciding, a direction of traveling of the user is decided based on a result of determination performed in the action determining and the velocity vector calculated in the vector calculating.

DESCRIPTION OF THE EMBODIMENTS

Embodiment 1

Embodiment 1 will be described by using FIGS. 1 to 4.
Configuration of Travelling Direction Calculation Apparatus 1

Figure 1:
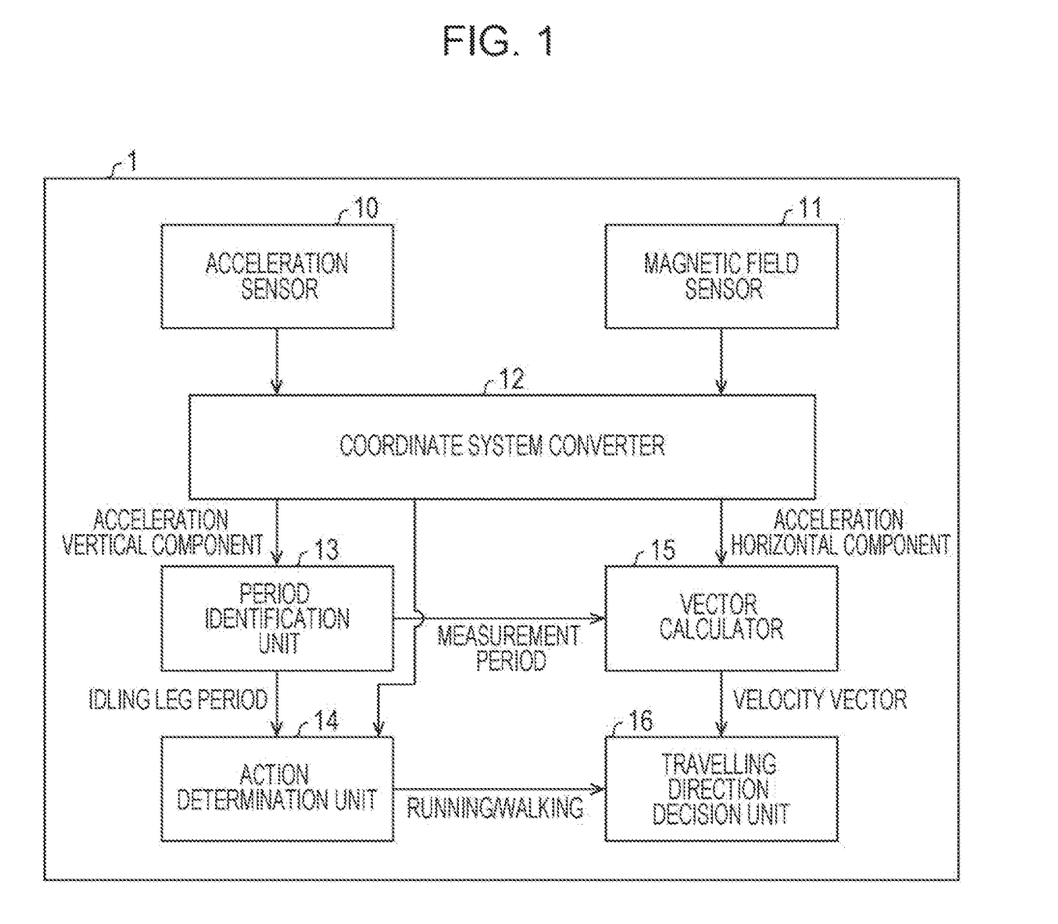
FIG. 1 is a block diagram of a travelling direction calculation apparatus according to Embodiment 1.

FIG. 1 is a block diagram of a travelling direction calculation apparatus 1 according to Embodiment 1. As illustrated in FIG. 1, the travelling direction calculation apparatus 1 includes an acceleration sensor 10, a magnetic field sensor 11, a coordinate system converter 12, a period identification unit 13, an action determination unit 14, a vector calculator 15, and a travelling direction decision unit 16.

The acceleration sensor 10 detects the acceleration of the travelling direction calculation apparatus 1 in directions of three mutually orthogonal axes (hereinafter, referred to as XYZ axes). The acceleration sensor 10 transmits, to the coordinate system converter 12, acceleration data representing the detected acceleration of the travelling direction calculation apparatus 1. The magnetic field sensor 11 detects the strength of a magnetic field in the directions of mutually orthogonal XYZ axes. The magnetic field sensor 11 transmits magnetic field data representing the detected strength of the magnetic field to the coordinate system converter 12.

The coordinate system converter 12, the period identification unit 13, the action determination unit 14, the vector calculator 15, and the travelling direction decision unit 16 decide the direction of travelling of a user based on the acceleration data acquired from the acceleration sensor 10 and the magnetic field data acquired from the magnetic field sensor 11. A specific example of a process for deciding the direction of the travelling of the user executed by the coordinate system converter 12, the period identification unit 13, the action determination unit 14, the vector calculator 15, and the travelling direction decision unit 16 will be described later. The coordinate system converter 12, the period identification unit 13, the action determination unit 14, the vector calculator 15, and the travelling direction decision unit 16 are implemented by a central processing unit (CPU) and a memory included in the travelling direction calculation apparatus 1.

Figure 2:
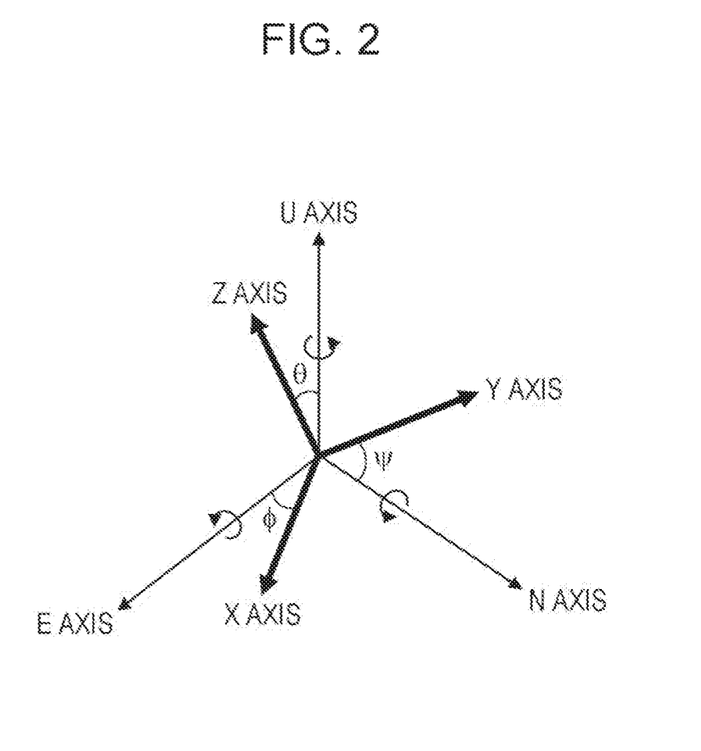
FIG. 2 is a view illustrating relationships between sensor axes and absolute coordinate axes according to Embodiment 1.
Figure 3:
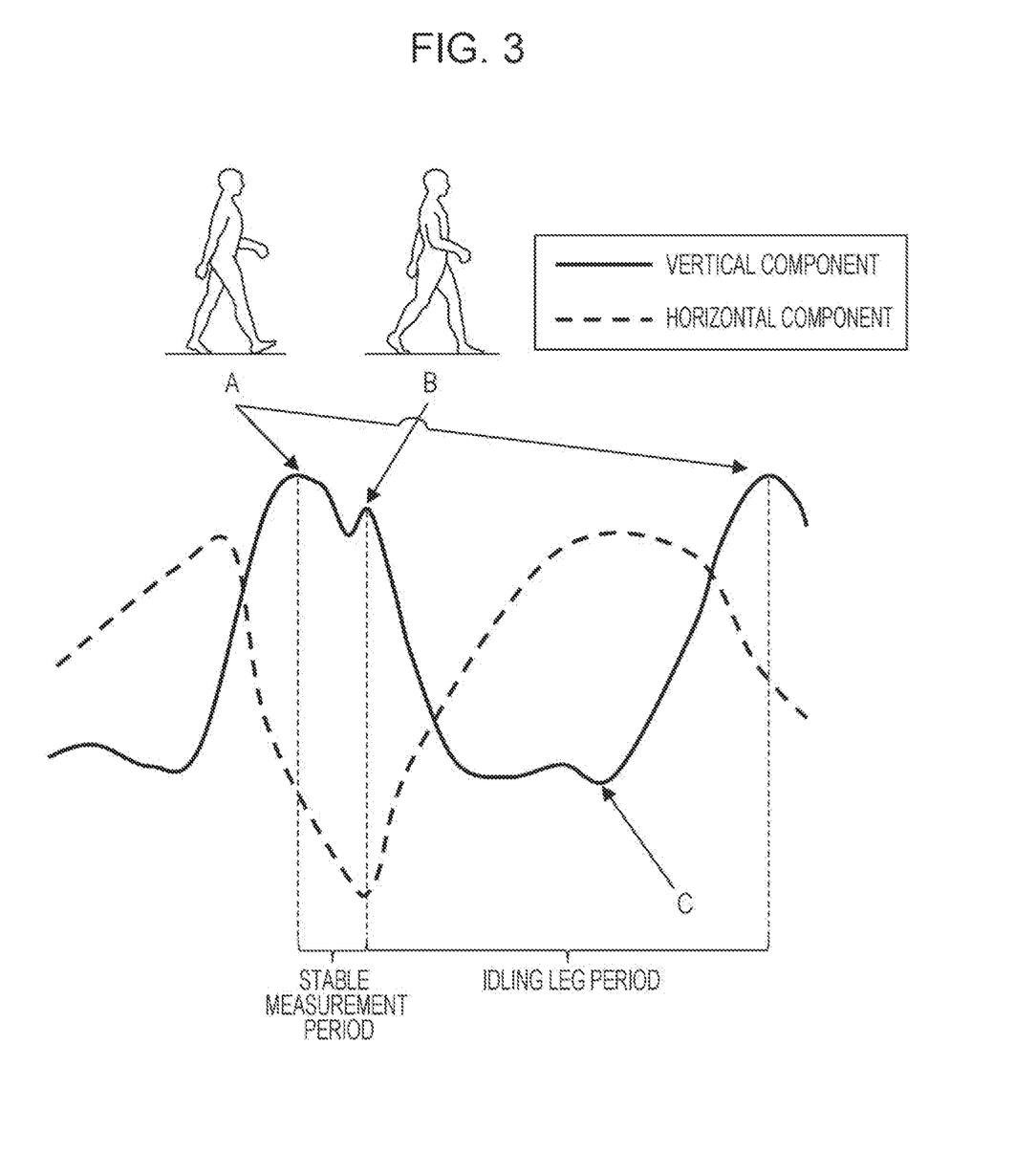
FIG. 3 is a view illustrating a relationship between an analyzed walking motion and acceleration according to Embodiment 1.
Figure 4:
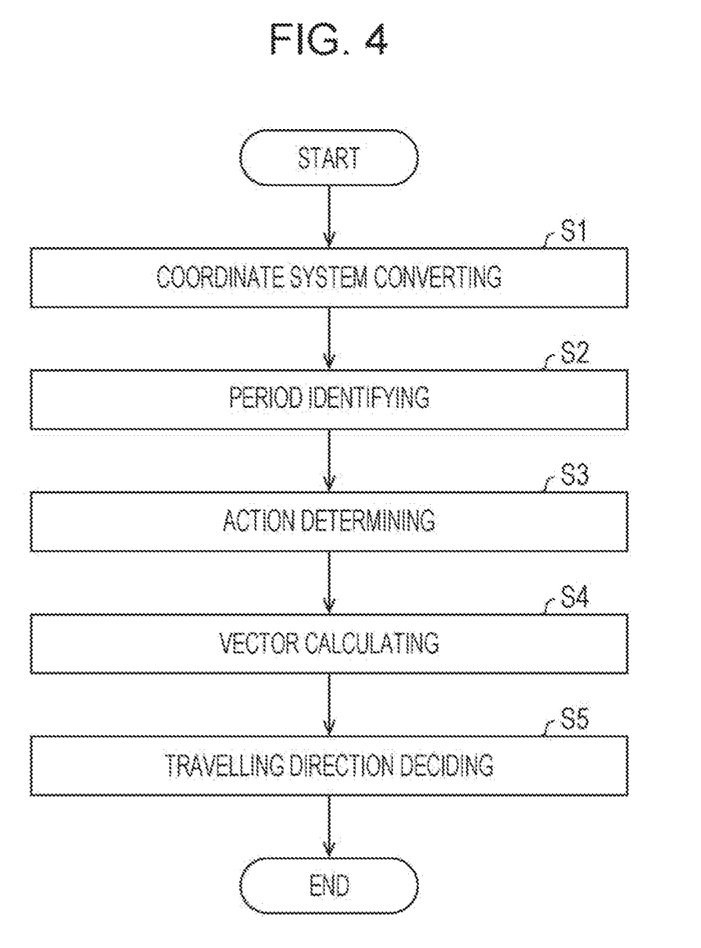
FIG. 4 is a flowchart illustrating the flow of a travelling direction decision method according to Embodiment 1.

FIG. 1 illustrates the acceleration sensor 10 and the magnetic field sensor 11 provided separately as hardware. However, the travelling direction calculation apparatus 1 may include a six axis sensor having the acceleration sensor 10 and the magnetic field sensor 11 integrated in one package and may also include a different type of sensor such as a gyro sensor in addition to the acceleration sensor 10 and the magnetic field sensor 11. The coordinate system converter 12, the period identification unit 13, the action determination unit 14, the vector calculator 15, and the travelling direction decision unit 16 are illustrated as independent functional blocks in FIG. 1 but may be implemented as software of a micro controller unit (MCU).
Flow in Travelling Direction Decision Method How the coordinate system converter 12, the period identification unit 13, the action determination unit 14, the vector calculator 15, and the travelling direction decision unit 16 decide the direction of the traveling of the user will be described by using FIGS. 2 to 4. FIG. 2 is a view illustrating relationships between sensor axes and absolute coordinate axes. FIG. 3 is a view illustrating a relationship between an analyzed walking motion and acceleration. FIG. 4 is a flowchart illustrating the flow of a travelling direction decision method.

As illustrated in FIG. 4, the method for deciding the direction of the traveling of the user includes steps S1 to S5. Hereinafter, details of steps S1 to S5 in FIG. 4 will be described in order with reference to FIGS. 2 and 3.

S1. Coordinate System Converting

Hereinafter, the three-axial-direction acceleration data acquired from the acceleration sensor 10 by the coordinate system converter 12 is referred to as an acceleration vector. The three-axial-direction magnetic field data acquired from the magnetic field sensor 11 by the coordinate system converter 12 is referred to as a magnetic field vector.

In step S1, the coordinate system converter 12 of the travelling direction calculation apparatus 1 converts an acceleration vector in an XYZ coordinate system to an acceleration vector in an ENU coordinate system. The ENU coordinate system is also referred to as an orthogonal horizontal coordinate system. In the ENU coordinate system, with respect to the travelling direction calculation apparatus 1 (user), a direction to the east is the positive direction of the E axis, a direction to the north is the positive direction of the N axis, and the direction to the vertex is the positive direction of the U axis. That is, the ENU coordinate system is composed of one axis extending vertically (U axis) and two axes on the horizontal plane (E axis and N axis). The XYZ axes do not necessarily coincide with the ENU axes, depending on the posture of the user holding the travelling direction calculation apparatus 1.

Specifically, in this step, when the user is stationary, the coordinate system converter 12 first acquires an acceleration vector in the XYZ coordinate system from the acceleration sensor 10. Since the acceleration sensor 10 detects only gravitational acceleration when the user is stationary, the direction of the acceleration vector is the vertical direction. The vertical direction corresponds to the U-axis direction in the ENU coordinate system. Accordingly, if the Z-axis direction coincides with the U-axis direction, the X component and the Y component are zero in the acceleration vector in the vertical direction in the XYZ coordinate system. In other words, if at least one of the X component and the Y component of the acceleration vector in the XYZ coordinate system is not zero, the Z-axis direction and the U-axis direction deviate from each other. Accordingly, the coordinate system converter 12 can calculate a difference between the Z-axis direction and the U-axis direction based on the X component and the Y component of the acceleration vector in the XYZ coordinate system.

In this step, the coordinate system converter 12 then acquires a magnetic field vector in the XYZ coordinate system from the magnetic field sensor 11. The magnetic field vector includes a magnetic north component and a vertically downward component any time. The magnetic north component of the magnetic field vector corresponds to a component in the positive direction of the N axis in the ENU coordinate system. The vertically downward component of the magnetic field vector corresponds to a component in the negative direction of the U axis. The coordinate system converter 12 removes the vertically downward component from the magnetic field vector. The coordinate system converter 12 can thereby identify the N-axis direction in the ENU coordinate system. The coordinate system converter 12 calculates a difference between the identified N-axis direction and the Y-axis direction. If the coordinate system converter 12 calculates the difference between the U-axis direction and the Z-axis direction and the difference between the N-axis direction and the Y-axis direction in this manner, the coordinate system converter 12 can also calculate a difference between the E-axis direction and the X-axis direction. Hereinafter, the differences between the XYZ axes and the ENU axes are also referred to as a posture.

As illustrated in FIG. 2, differences between the XYZ axes and the ENU axes, that is, a posture is expressed by roll ($\varphi$), yaw ($\psi$), and pitch ($\theta$). Roll ($\varphi$), yaw ($\psi$), and pitch ($\theta$) are referred to as the Euler angles. Roll ($\varphi$) represents the difference between the X axis and the E axis, yaw ($\psi$) represents the difference between the Y axis and the N axis, and pitch ($\theta$) represents the difference between the Z axis and the U axis.

The coordinate system converter 12 converts an acceleration vector in the XYZ coordinate system (Ax, Ay, Az) to an acceleration vector (Ae, An, Au) in the ENU coordinate system by using a rotation matrix corresponding to the posture. Formula (1) below expresses the rotation matrix by using the Euler angles (roll ($\varphi$), pitch ($\theta$), yaw $$\begin{pmatrix} Ae \\ An \\ Au \end{pmatrix} = \begin{bmatrix} \cos\psi\cos\theta\cos\varphi - \sin\psi\sin\varphi & -\sin\psi\cos\theta\cos\varphi - \cos\psi\sin\varphi & \sin\theta\cos\varphi \\ \cos\psi\cos\theta\sin\varphi - \sin\psi\cos\varphi & -\sin\psi\cos\theta\sin\varphi + \cos\psi\cos\varphi & \sin\theta\sin\varphi \\ -\cos\psi\sin\theta & \sin\psi\sin\theta & \cos\theta \end{bmatrix} \begin{pmatrix} Ax \\ Ay \\ Az \end{pmatrix} \quad (1)$$

The coordinate system converter 12 can acquire a horizontal component (An, Au) of the acceleration vector by removing the U component from the acceleration vector (Ae, An, Au) in the ENU coordinate system and can also acquire a vertical component (Ae) of the acceleration vector by extracting the U component from the acceleration vector (Ae, An, Au) in the ENU coordinate system.

The coordinate system converter 12 transmits data regarding the vertical component of the acceleration vector to the period identification unit 13 and the action determination unit 14 and transmits data regarding the horizontal component of the acceleration vector to the vector calculator 15, the vertical component being calculated in accordance with Formula (1).

S2. Period Identifying

In step S2, the period identification unit 13 of the travelling direction calculation apparatus 1 identifies a stable measurement period and an idling leg period by analyzing the data regarding the vertical component of the acceleration vector and the horizontal component acquired from the coordinate system converter 12. The period identification unit 13 identifies, as a first time point, a time point when the vertical component of the acceleration vector takes on the first maximum value, identifies, as a second time point, a time point when the vertical component of the acceleration vector takes on the second maximum value, and identifies, as the stable measurement period, a period from the identified first time point to the identified second time point.

In an example identification method, based on change in the vertical component of the acceleration vector, the period identification unit 13 identifies a time point when the heel of a foot of the user lands on the ground as the first time point and identifies a time point when the toe of the foot of the user lands on the ground as the second time point, as to be described later. A period between a stable measurement period and the next stable measurement period is an idling leg period.

FIG. 3 illustrates an example of changes of the vertical component and the horizontal component of the acceleration vector that are observed while the user is walking. Attention is focused on an acceleration vector in a period from a point A illustrated in FIG. 3 (first time point) to a point B (second time point). The period from the point A to the point B is the aforementioned stable measurement period.

As illustrated in FIG. 3, the point A that is the start point of the stable measurement period is a time point when the heel of a foot (forward foot for stepping forward) of the user lands on the ground. At this time, the foot of the user that lands on the ground receives a reaction force from the ground. Accordingly, the vertical component of the acceleration vector has a first peak projecting upward (corresponding to the aforementioned first maximum value) at the point A. After the point A, the vertical component of the acceleration vector is decreased once and then is increased again. The point B that is the end point of the stable measurement period is a time point when the toe of the forward foot of the user lands on the ground. At this time, the foot of the user that lands on the ground receives a reaction force from the ground. Accordingly, the vertical component of the acceleration vector has a second peak projecting upward (corresponding to the aforementioned second maximum value) at the point B.

Generally, when persons walk, a period from a time point when the heel of a foot of each person lands on the ground to a time point when the toe of the foot lands on the ground does not vary much from person to person.

With the configuration described above, the period from the time point when the heel of a foot of the user lands on the ground to the time point when the toe of the foot of the user lands on the ground is handled as the stable measurement period, and thus it is possible to identify the stable measurement period in a part less likely to have the individual difference in walking or running.

As the result, the travelling direction calculation apparatus 1 can appropriately discriminate between walking and running in the stable measurement period described above.

In another example identification method, based on change in the vertical component of the acceleration vector, the period identification unit 13 identifies a time point when the heel of a foot of the user lands on the ground as the first time point and identifies a time point when the heel of the other foot of the user floats as the second time point, as to be described later. Specifically, the method using the point B as the time point when the heel of the other foot of the user (rear foot) floats is also usable. After the point A, the vertical component of the acceleration vector is decreased once and then is increased again. The point B that is the end point of the stable measurement period is a time point when the user pushes off from the ground with the other foot (rear foot) or the time point when the heel of the rear foot floats. At this time, the other foot of the user pushing off from the ground receives a reaction force from the ground. Accordingly, the vertical component of the acceleration vector has a second peak projecting upward (corresponding to the aforementioned second maximum value) at the point B. It can also be said that the stable measurement period is a period from the time point when the heel of a foot of the user lands on the ground to the time point when the heel of the other foot of the user floats.

As illustrated in FIG. 3, the user drastically slows down in the stable measurement period, and thus the acceleration vector takes on a relatively large value. This is attributable to the following. In walking, a braking force applied when a foot lands on the ground leads to a force applied in a direction opposite to the travelling direction. In running, acceleration in a period from landing of the foot to leaving leads to a force applied in the travelling direction. The variation in the acceleration vector in the stable measurement period is smaller than the variation in the acceleration vector in the idling leg period, as illustrated in FIG. 3. Accordingly, the travelling direction calculation apparatus 1 can discriminate between the walking and the running in the stable measurement period more appropriately.

The period identification unit 13 transmits the identified information regarding the stable measurement period to the vector calculator 15 and information regarding the idling leg period to the action determination unit 14. In the illustration in FIG. 3, the information regarding the stable measurement period represents time from the point A to the point B, and the information regarding the idling leg period represents time from the point B to the next stable measurement period.

S3. Action Determining

In step S3, the action determination unit 14 of the travelling direction calculation apparatus 1 identifies whether the user is walking or running by analyzing the vertical component of the acceleration vector acquired from the coordinate system converter 12 and the idling leg period acquired from the period identification unit 13.

The vertical component of the acceleration vector has upward positive acceleration as a drag force against the gravitational acceleration at the time of landing and has a negative value when both the feet are completely off the ground. Walking is defined as an action involving with one of feet in contact with the ground at any time, and running is defined as an action involving with a moment at which both the feet float. As illustrated in FIG. 3, the vertical component of the acceleration vector has a bottom projecting downward at a point C in the idling leg period. When the vertical component of the acceleration vector at the bottom has a positive value, the action is determined as walking. When the vertical component has a negative value, the action is determined as running.

The action determination unit 14 determines walking or running as an action of the user and thereafter transmits the determination result to the travelling direction decision unit 16.

S4. Vector Calculating

In step S4, the vector calculator 15 of the travelling direction calculation apparatus 1 acquires the information regarding the stable measurement period from the period identification unit 13. The vector calculator 15 calculates a velocity vector in the stable measurement period by integrating the horizontal component of the acceleration vector in the stable measurement period. The vector calculator 15 transmits the calculated information regarding the velocity vector to the travelling direction decision unit 16.

With the configuration described above, the velocity vector in the stable measurement period can be calculated with high accuracy.

S5. Travelling Direction Deciding

In step S5, the travelling direction decision unit 16 of the travelling direction calculation apparatus 1 decides the direction of the traveling of the user based on the result of the determination performed by the action determination unit 14 and the velocity vector calculated by the vector calculator 15. Specifically, the travelling direction decision unit 16 decides a direction opposite to the direction of the velocity vector as the direction of the traveling of the user for the walking and decides the direction of the velocity vector as the direction of the traveling of the user for the running.

With the configuration described above, the direction of the traveling of the user can be appropriately decided in the stable measurement period.

As described above, the travelling direction decision method in this embodiment that is a travelling direction decision method performed by the travelling direction calculation apparatus 1. The travelling direction decision method includes the acceleration sensor 10 that detects acceleration in the three axial directions occurring on the user includes the period identifying S2, the action determining S3, the vector calculating S4, and the travelling direction deciding S5. In the period identifying S2, the stable measurement period and the idling leg period are identified based on change in the vertical component of the acceleration detected by the acceleration sensor 10. In the action determining S3, walking and running are discriminated by referring to the vertical component of the acceleration in the idling leg period. In the vector calculating S4, the velocity vector is calculated from the horizontal component of the acceleration in the stable measurement period. In the travelling direction deciding S5, the direction of the traveling of the user is decided based on the result of the determination performed in the action determining S3 and the velocity vector calculated in the vector calculating S4.

With the configuration described above, running and walking can be discriminated, and the travelling direction can be detected with high accuracy.

Embodiment 2

Another embodiment of the present disclosure will hereinafter be described with reference to FIGS. 5 to 7. Embodiment 2 is different from Embodiment 1 in the method for separating the vertical component and the horizontal component of the acceleration occurring on a user. Hereinafter, the attention is focused on the difference.

Configuration of Travelling Direction Calculation Apparatus 2

Figure 5:
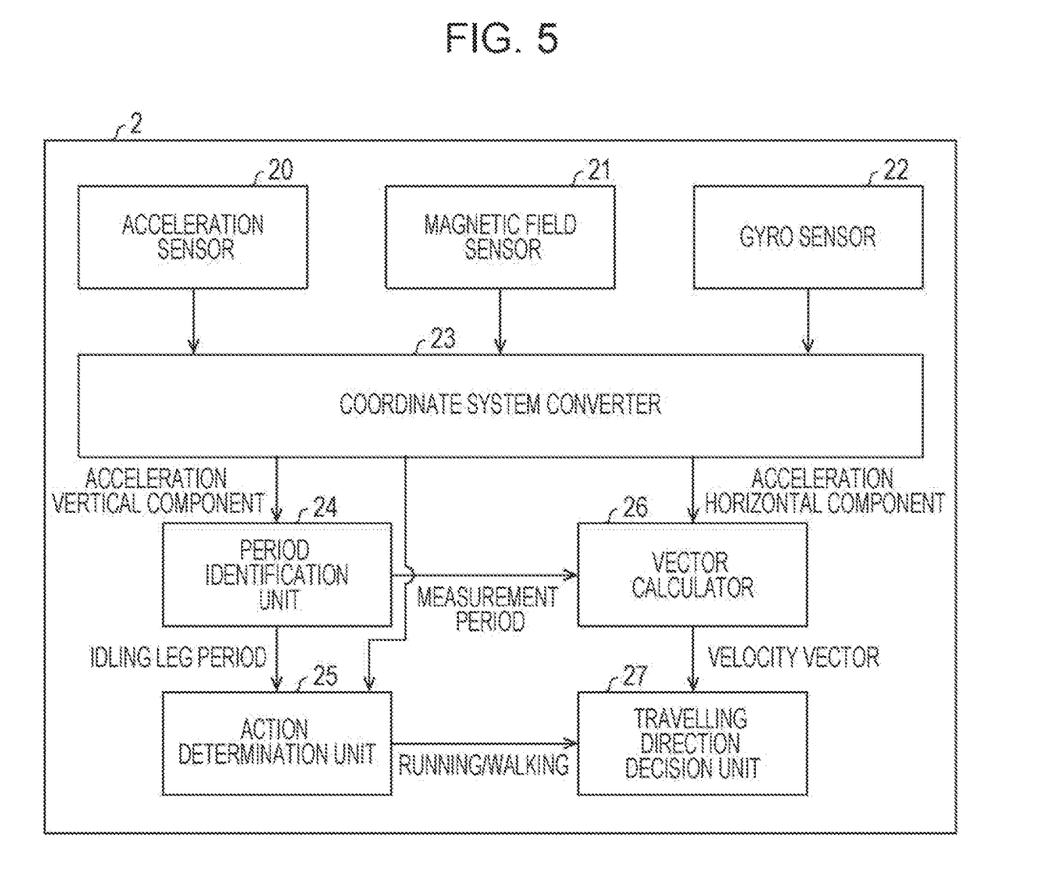
FIG. 5 is a block diagram of a travelling direction calculation apparatus according to Embodiment 2.
Figure 6:
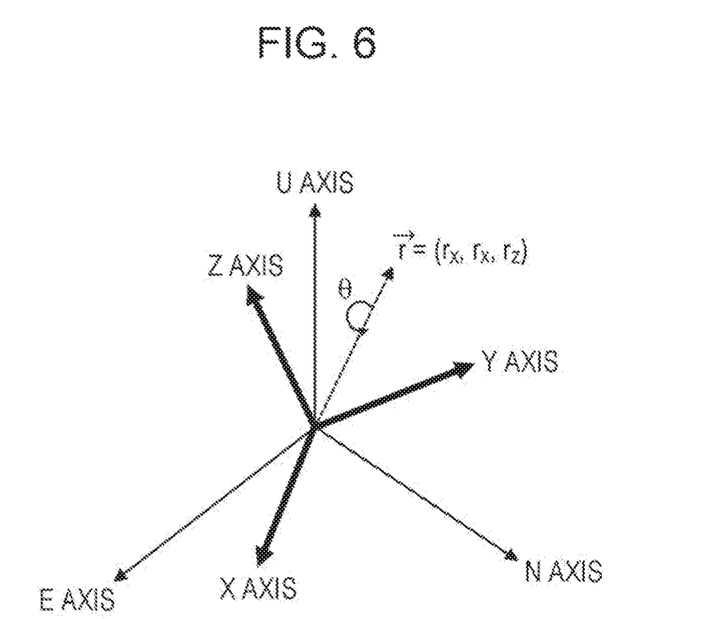
FIG. 6 is a view illustrating relationships between sensor axes and absolute coordinate axes according to Embodiment 2.

FIG. 5 is a block diagram of a travelling direction calculation apparatus 2 according to Embodiment 2. As illustrated in FIG. 5, the travelling direction calculation apparatus 2 includes an acceleration sensor 20, a magnetic field sensor 21, a gyro sensor 22, a coordinate system converter 23, a period identification unit 24, an action determination unit 25, a vector calculator 26, and a travelling direction decision unit 27.

The acceleration sensor 20 and the magnetic field sensor 21 have the same configurations as those of the acceleration sensor 10 and the magnetic field sensor 11 in Embodiment 1, and thus detailed description thereof is omitted. The gyro sensor 22 detects the angular velocity of rotation about each of the mutually orthogonal XYZ axes. The gyro sensor 22 transmits data representing the detected angular velocity to the coordinate system converter 23.

The coordinate system converter 23, the period identification unit 24, the action determination unit 25, the vector calculator 26, and the travelling direction decision unit 27 decide the direction of the traveling of the user based on the acceleration data acquired from the acceleration sensor 20, the magnetic field data acquired from the magnetic field sensor 21, and the angular velocity data acquired from the gyro sensor 22. The coordinate system converter 23, the period identification unit 24, the action determination unit 25, the vector calculator 26, and the travelling direction decision unit 27 are implemented by a CPU and a memory included in the travelling direction calculation apparatus 2.

Flow in Travelling Direction Decision Method

How the coordinate system converter 23, the period identification unit 24, the action determination unit 25, the vector calculator 26, and the travelling direction decision unit 27 decide the direction of the traveling of the user will be described by using FIGS. 6 and 7. FIG. 6 is a view illustrating relationships between sensor axes and absolute coordinate axes according to Embodiment 2. FIG. 7 is a flowchart illustrating the flow of a travelling direction decision method according to Embodiment 2.

Figure 7:
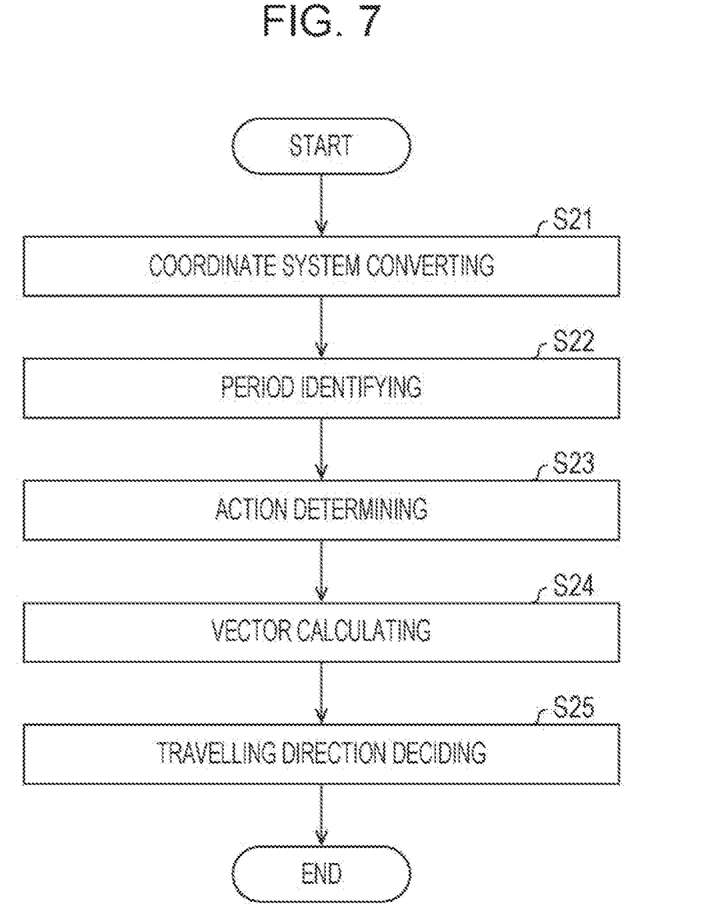
FIG. 7 is a flowchart illustrating the flow of a travelling direction decision method according to Embodiment 2.

As illustrated in FIG. 7, the method for deciding the direction of the traveling of the user includes steps S21 to S25. Hereinafter, details of steps S21 to S25 will be described in order.

S21. Coordinate System Converting

Hereinafter, the three-axial-direction acceleration data acquired from the acceleration sensor 20 by the coordinate system converter 23 is referred to as an acceleration vector. The three-axial-direction magnetic field data acquired from the magnetic field sensor 21 by the coordinate system converter 23 is referred to as a magnetic field vector. The three-axial-direction angular velocity data acquired from the gyro sensor 22 by the coordinate system converter 23 is referred to as an angular velocity vector.

In step S21, the coordinate system converter 23 of the travelling direction calculation apparatus 2 converts an acceleration vector in the XYZ coordinate system to an acceleration vector in the ENU coordinate system. The ENU coordinate system is also referred to as the orthogonal horizontal coordinate system. In the ENU coordinate system, with respect to the travelling direction calculation apparatus 2 (user), a direction to the east is the positive direction of the E axis, a direction to the north is the positive direction of the N axis, and a direction to the vertex is the positive direction of the U axis. That is, the ENU coordinate system is composed of one axis extending vertically (U axis) and two axes on the horizontal plane (E axis and N axis). The XYZ axes do not necessarily coincide with the ENU axes, depending on the posture of the user holding the travelling direction calculation apparatus 2.

Specifically, in this step, when the user is stationary, the coordinate system converter 23 first acquires an acceleration vector in the XYZ coordinate system from the acceleration sensor 20. Since the acceleration sensor 20 detects only gravitational acceleration when the user is stationary, the direction of the acceleration vector is the vertical direction. The vertical direction corresponds to the U-axis direction in the ENU coordinate system. Accordingly, if the Z-axis direction coincides with the U-axis direction, the X component and the Y component are zero in the acceleration vector in the vertical direction in the XYZ coordinate system. In other words, if at least one of the X component and the Y component of the acceleration vector in the XYZ coordinate system is not zero, the Z-axis direction and the U-axis direction deviate from each other. Accordingly, the coordinate system converter 23 can calculate a difference between the Z-axis direction and the U-axis direction based on the X component and the Y component of the acceleration vector in the XYZ coordinate system.

In this step, the coordinate system converter 23 then acquires a magnetic field vector in the XYZ coordinate system from the magnetic field sensor 21. The magnetic field vector includes a magnetic north component and a vertically downward component any time. The magnetic north component of the magnetic field vector corresponds to a component in the positive direction of the N axis in the ENU coordinate system. The vertically downward component of the magnetic field vector corresponds to a component in the negative direction of the U axis. The coordinate system converter 23 removes the vertically downward component from the magnetic field vector. The coordinate system converter 23 can thereby identify the N-axis direction in the ENU coordinate system. The coordinate system converter 23 calculates a difference between the identified N-axis direction and the Y-axis direction. If the coordinate system converter 23 calculates the difference between the U-axis direction and the Z-axis direction and the difference between the N-axis direction and the Y-axis direction in this manner, the coordinate system converter 23 can also calculate a difference between the E-axis direction and the X-axis direction. Hereinafter, the differences between the XYZ axes and the ENU axes are also referred to as a posture.

A quaternion corresponding to the posture is expressed as Formula (2) below.

$$\hat{Q} = (Qw, Qx, Qy, Qz) = \left(\cos\frac{\theta}{2}, -r_x\sin\frac{\theta}{2}, -r_y\sin\frac{\theta}{2}, r_z\sin\frac{\theta}{2}\right) \quad (2)$$

The posture at time t=k is denoted as below.

$$\hat{Q}_k \quad (3)$$

The posture at t=k+1 is denoted as below.

$$\hat{Q}_{k+1} \quad (4)$$

The coordinate system converter 23 can obtain the posture denoted below by using the acceleration vector and the magnetic field vector by using Formula (2).

$$\hat{Q}a_{k+1} \quad (5)$$

In contrast, if the angular velocity vector is used, the posture can be obtained in accordance with Formula (6).

$$\hat{Q}j_{k+1} = \begin{pmatrix} 0 & -W_x & -W_y & -W_z \\ W_x & 0 & W_z & -W_y \\ W_y & -W_z & 0 & W_x \\ W_z & W_y & -W_x & 0 \end{pmatrix} \hat{Q}_k \quad (6)$$

Note that Wx, Wy, and Wz denote components of the angular velocity vector.

From $$\hat{Q}a_{k+1} \quad (7)$$

and $$\hat{Q}j_{k+1} \quad (8),$$

a filtered posture $$\hat{Q}_{k+1} \quad (9)$$

is obtained.

To obtain the filtered posture, there are several methods such as complementary filter and Kalman filter. Formula (10) herein represents the complementary filter that is the simplest method. The coordinate system converter 23 calculates the filtered posture by using Formula (10).

$$\hat{Q}_{k+1} = \alpha \times \hat{Q}a_{k+1} + (1-\alpha) \times \hat{Q}j_{k+1} \quad (10)$$

α: any value

The coordinate system conversion using the quaternion representing the filtered posture is expressed as Formula (11). The coordinate system converter 23 converts the coordinate system by using Formula (11).

$$\begin{pmatrix} Aw \\ As \\ An \\ Au \end{pmatrix} = \hat{Q} \begin{pmatrix} 0 \\ Ax \\ Ay \\ Az \end{pmatrix} \hat{Q}^* \quad (11)$$

The coordinate system converter 23 can acquire a horizontal component (An, Au) of the acceleration vector by removing the U component from the acceleration vector (Ae, An, Au) in the ENU coordinate system and can also acquire a vertical component (Ae) of the acceleration vector by extracting the U component from the acceleration vector (Ae, An, Au) in the ENU coordinate system.

The coordinate system converter 23 transmits the data regarding the vertical component of the acceleration vector calculated in accordance with Formulas (2) to (5) to the period identification unit 24 and the action determination unit 25 and transmits the data regarding the horizontal component of the acceleration vector to the vector calculator 26.

Since steps S22 to S25 are performed in the same manner as in steps S3 to S6 in Embodiment 1, detailed description of steps S22 to S25 is omitted.

Embodiment 3

Example Implementation by Software

The control blocks of the travelling direction calculation apparatus 1 (in particular, the coordinate system converter 12, the period identification unit 13, the action determination unit 14, the vector calculator 15, and the travelling direction decision unit 16) may be implemented by logical circuits (hardware) formed on an integrated circuit (IC chip) or the like or may be implemented by software by using a CPU. Likewise, the control blocks of the travelling direction calculation apparatus 2 (in particular, the coordinate system converter 23, the period identification unit 24, the action determination unit 25, the vector calculator 26, and the travelling direction decision unit 27 may be implemented by logical circuits (hardware) formed on an integrated circuit (IC chip) or the like or may be implemented by software by using a CPU.

In the latter case, the travelling direction calculation apparatuses 1 and 2 each include a CPU that executes instructions of a program that is software implementing the functions of the travelling direction calculation apparatuses 1 and 2, a read only memory (ROM) or a storage (these are each referred to as a recording medium) in which the program and various pieces of data are recorded to be readable by a computer (or the CPU), a random access memory (RAM) into which the program is loaded, and other components. The computer (or the CPU) reads out the program from the recording medium and runs the program, and thereby the present disclosure is implemented. As the recording medium, a "non-transitory tangible medium" such as tape, a disc, a card, a semiconductor memory, or a programmable logical circuit may be used. The program may also be provided to the computer via any transmission medium (such as a communication network or a broadcast wave) capable of transmitting the program. Note that an aspect of the present disclosure may be implemented in a form of a data signal as which the program is embodied by being electronically transferred and that is embedded in a carrier wave.

SUMMARIZATION

A travelling direction calculation apparatus according to a first aspect of the present disclosure includes an acceleration sensor (10, 20), a period identification unit (13, 24), an action determination unit (14, 25), a vector calculator (15, 26), a vector calculator (15, 26), and a travelling direction decision unit (16, 27). The acceleration sensor (10, 20) detects acceleration in three axial directions occurring on a user. The period identification unit (13, 24) identifies a stable measurement period and an idling leg period based on change in a vertical component of the acceleration detected by the acceleration sensor (10, 20). The action determination unit (14, 25) discriminates between walking and running by referring to the vertical component of the acceleration in the idling leg period. The vector calculator (15, 26) calculates a velocity vector from a horizontal component of the acceleration in the stable measurement period. The travelling direction decision unit (16, 27) decides a direction of traveling of the user based on a result of determination performed by the action determination unit (14, 25) and the velocity vector calculated by the vector calculator (15, 26).

With the configuration described above, running and walking can be discriminated, and the travelling direction calculation apparatus that can detect the travelling direction with high accuracy can be provided.

In the first aspect described above, in the travelling direction calculation apparatus according to a second aspect of the present disclosure, the period identification unit (13, 24) may identify, as a first time point, a time point when the vertical component of the acceleration takes on a first maximum value, identify, as a second time point, a time point when the vertical component of the acceleration takes on a second maximum value, and identify, as the stable measurement period, a period from the identified first time point to the identified second time point.

With the configuration described above, the stable measurement period can be appropriately identified by using the first time point and the second time point.

In the second aspect described above, in the travelling direction calculation apparatus according to a third aspect of the present disclosure, based on the change in the vertical component of the acceleration, the period identification unit (13, 24) may identify a time point when a heel of a foot of the user lands on ground as the first time point and may identify a time point when a toe of the foot of the user lands on the ground as the second time point.

With the configuration described above, the first time point and the second time point can be appropriately identified by using the motion of the foot of the user.

In the second aspect described above, in the travelling direction calculation apparatus according to a fourth aspect of the present disclosure, based on the change in the vertical component of the acceleration, the period identification unit (13, 24) may identify a time point when a heel of a first foot of the user lands on ground as the first time point and may identify a time point when a heel of a second foot of the user floats as the second time point.

With the configuration described above, the first time point and the second time point can be appropriately identified by using the motion of both the feet of the user.

In any one of the first to fourth aspects described above, in the travelling direction calculation apparatus according to a fifth aspect of the present disclosure, the vector calculator (15, 26) may calculate the velocity vector by integrating the horizontal component of the acceleration in the stable measurement period.

With the configuration described above, the velocity vector in the stable measurement period can be calculated with high accuracy.

In any one of the first to fifth aspects described above, in the travelling direction calculation apparatus according to a sixth aspect of the present disclosure, as the direction of the traveling of the user, the travelling direction decision unit (16, 27) may decide a direction identical to a direction of the velocity vector for the walking and decide a direction opposite to the direction of the velocity vector for the running.

With the configuration described above, the direction of the traveling of the user can be decided based on the direction of the velocity vector by using the mutually opposing directions, that is, the direction of the traveling of the user and the velocity direction in the stable measurement period.

In any one of the first to sixth aspects described above, the travelling direction calculation apparatus according to a seventh aspect of the present disclosure may further include a magnetic field sensor (11, 21) and a coordinate system converter (12, 23) that performs conversion of a coordinate system for the acceleration detected by the acceleration sensor (10, 20) to a coordinate system including two axes respectively extending vertically and horizontally. The conversion is performed based on a direction of a magnetic field detected by the magnetic field sensor (11, 21). The period identification unit (13, 24) may identify the stable measurement period based on the vertical component of the acceleration in the coordinate system resulting from the conversion performed by the coordinate system converter (12, 23).

With the configuration described above, the acceleration in the three axial directions detected by the acceleration sensor (10, 20) can be separated into the vertical component and the horizontal component by converting the coordinate system of the acceleration. The stable measurement period can be identified based on the separated vertical component of the acceleration.

In any one of the first to sixth aspects described above, the travelling direction calculation apparatus according to an eighth aspect of the present disclosure further includes a gyro sensor (22) and a coordinate system converter (12, 23) that performs conversion of a coordinate system for the acceleration detected by the acceleration sensor (10, 20) to a coordinate system including two axes respectively extending vertically and horizontally. The conversion is performed based on a rotation angle detected by the gyro sensor (22). The period identification unit (13, 24) may identify the stable measurement period based on the vertical component of the acceleration in the coordinate system resulting from the conversion performed by the coordinate system converter (12, 23).

The configuration described above also exerts the same effect as that of the seventh aspect described above.

In the seventh aspect described above, the travelling direction calculation apparatus according to a ninth aspect of the present disclosure may further include a gyro sensor (22). The coordinate system converter (12, 23) may perform the conversion of the coordinate system for the acceleration detected by the acceleration sensor (10, 20) to the coordinate system including the two axes respectively extending vertically and horizontally. The conversion is performed further based on a rotation angle detected by the gyro sensor (22). The period identification unit (13, 24) may identify the stable measurement period based on the vertical component of the acceleration in the coordinate system resulting from the conversion performed by the coordinate system converter (12, 23).

With the configuration described above, the coordinate system converter (12, 23) performs the conversion of the coordinate system for the acceleration further based on the rotation angle detected by the gyro sensor (22), and thereby the acceleration in the three axial directions detected by the acceleration sensor (10, 20) can be separated into the vertical component and the horizontal component. The stable measurement period can be identified based on the separated vertical component of the acceleration.

A travelling direction decision method according to a tenth aspect of the present disclosure is a travelling direction decision method performed by a travelling direction calculation apparatus including an acceleration sensor that detects acceleration in three axial directions occurring on a user. The method includes period identifying, action determining, vector calculating, and travelling direction deciding. In the period identifying, a stable measurement period and an idling leg period are identified based on change in a vertical component of the acceleration detected by the acceleration sensor. In the action determining, walking and running are discriminated by referring to the vertical component of the acceleration in the idling leg period. In the vector calculating, a velocity vector is calculated from a horizontal component of the acceleration in the stable measurement period. In the travelling direction deciding, a direction of traveling of the user is decided based on a result of determination performed in the action determining and the velocity vector calculated in the vector calculating.

The configuration described above exerts the same effect as that of the travelling direction calculation apparatus according to the first aspect described above.

In the tenth aspect described above, in the travelling direction decision method according to an eleventh aspect of the present disclosure, in the period identifying, a time point when the vertical component of the acceleration takes on a first maximum value may be identified as a first time point, a time point when the vertical component of the acceleration takes on a second maximum value may be identified as a second time point, and a period from the identified first time point to the identified second time point may be identified as the stable measurement period.

The configuration described above exerts the same effect as that of the travelling direction calculation apparatus according to the second aspect described above.

In the eleventh aspect described above, in the travelling direction decision method according to a twelfth aspect of the present disclosure, in the period identifying, based on the change in the vertical component of the acceleration, a time point when a heel of a foot of the user lands on ground may be identified as the first time point, and a time point when a toe of the foot of the user lands on the ground may be identified as the second time point.

The configuration described above exerts the same effect as that of the travelling direction calculation apparatus according to the third aspect described above.

In the eleventh aspect described above, in the travelling direction decision method according to a thirteenth aspect of the present disclosure, in the period identifying, based on the change in the vertical component of the acceleration, a time point when a heel of a first foot of the user lands on ground may be identified as the first time point, and a time point when a heel of a second foot of the user floats may be identified as the second time point.

The configuration described above exerts the same effect as that of the travelling direction calculation apparatus according to the fourth aspect described above.

In any one of the tenth to thirteenth aspects described above, in the travelling direction decision method according to a fourteenth aspect of the present disclosure, in the vector calculating, the velocity vector may be calculated by integrating the horizontal component of the acceleration in the stable measurement period.

The configuration described above exerts the same effect as that of the travelling direction calculation apparatus according to the fifth aspect described above.

In any one of the tenth to fourteenth aspects described above, in the travelling direction decision method according to a fifteenth aspect of the present disclosure, in the travelling direction deciding, as the direction of the traveling of the user, a direction identical to a direction of the velocity vector may be decided for the walking, and a direction opposite to the direction of the velocity vector may be decided for the running.

The configuration described above exerts the same effect as that of the travelling direction calculation apparatus according to the sixth aspect described above.

In any one of the tenth to fifteenth aspects described above, the travelling direction decision method according to a sixteenth aspect of the present disclosure further includes coordinate system converting in which conversion of a coordinate system for the acceleration detected by the acceleration sensor to a coordinate system including two axes respectively extending vertically and horizontally is performed based on a direction of a magnetic field detected by a magnetic field sensor. In the period identifying, the stable measurement period may be identified based on the vertical component of the acceleration in the coordinate system resulting from the conversion performed in the coordinate system converting.

The configuration described above exerts the same effect as that of the travelling direction calculation apparatus according to the seventh aspect described above.

In any one of the tenth to fifteenth aspects described above, the travelling direction decision method according to a seventeenth aspect of the present disclosure further includes coordinate system converting in which conversion of a coordinate system for the acceleration detected by the acceleration sensor to a coordinate system including two axes respectively extending vertically and horizontally is performed based on a rotation angle detected by a gyro sensor. In the period identifying, the stable measurement period may be identified based on the vertical component of the acceleration in the coordinate system resulting from the conversion performed in the coordinate system converting.

The configuration described above exerts the same effect as that of the travelling direction calculation apparatus according to the eighth aspect described above.

In the sixteenth aspect described above, in the travelling direction decision method according to an eighteenth aspect of the present disclosure, in the coordinate system converting, the conversion of the coordinate system for the acceleration detected by the acceleration sensor to the coordinate system including the two axes respectively extending vertically and horizontally may be performed further based on a rotation angle detected by a gyro sensor. In the period identifying, the stable measurement period may be identified based on the vertical component of the acceleration in the coordinate system resulting from the conversion performed in the coordinate system converting.

The configuration described above exerts the same effect as that of the travelling direction calculation apparatus according to the ninth aspect described above.

A control program according to a nineteenth aspect of the present disclosure is a control program causing a computer to function as the travelling direction calculation apparatus according to the first aspect including the period identification unit, the action determination unit, the vector calculator, and the travelling direction decision unit.

The present disclosure is not limited to the embodiments described above. Various modifications may be made within the scope of claims. An embodiment obtained by appropriately combining technical measures disclosed in different embodiments is also included in the technical scope of the present disclosure. Further, a new technical feature may be created by combining technical measures disclosed in the embodiments.

The present disclosure contains subject matter related to that disclosed in Japanese Priority Patent Application JP 2018-082300 filed in the Japan Patent Office on Apr. 23, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A travelling direction calculation apparatus comprising:
an acceleration sensor that detects acceleration in three axial directions occurring on a user;
period identification circuitry that identifies a stable measurement period and an idling leg period based on a change in a vertical component of the acceleration detected by the acceleration sensor;
action determination circuitry that discriminates between walking and running, wherein when the vertical component of the idling leg period of the acceleration at a bottom has a positive value, the action is determined as walking, and when the vertical component of the idling leg period of the acceleration at the bottom has a negative value, the action is determined as running;
a vector calculator that calculates a velocity vector from a horizontal component of the acceleration in the stable measurement period; and
travelling direction decision circuitry that decides a direction of travelling of the user based on a result of determination performed by the action determination circuitry and the velocity vector calculated by the vector calculator.

2. A non-transitory computer readable medium storing a control program causing a computer to function as the travelling direction calculation apparatus according to claim 1, the computer comprising:
the period identification circuitry;
the action determination circuitry;
the vector calculator; and
the travelling direction decision circuitry.

3. The travelling direction calculation apparatus according to claim 1, further comprising:
a gyro sensor; and
a coordinate system converter that performs conversion of a coordinate system for the acceleration detected by the acceleration sensor to a coordinate system including two axes respectively extending vertically and horizontally, the conversion being performed based on a rotation angle detected by the gyro sensor,
wherein the period identification circuitry identifies the stable measurement period based on the vertical component of the acceleration in the coordinate system resulting from the conversion performed by the coordinate system converter.

4. The travelling direction calculation apparatus according to claim 1,
wherein to decide the direction of the travelling of the user, the travelling direction decision circuitry decides a direction identical to a direction of the velocity vector for the walking and decides a direction opposite to the direction of the velocity vector for the running.

5. The travelling direction calculation apparatus according to claim 1,
wherein the vector calculator calculates the velocity vector by integrating the horizontal component of the acceleration in the stable measurement period.

6. The travelling direction calculation apparatus according to claim 1,
wherein the period identification circuitry identifies, as a first time point, a time point when the vertical component of the acceleration takes on a first maximum value, identifies, as a second time point, a time point when the vertical component of the acceleration takes on a second maximum value, and identifies, as the stable measurement period, a period from the identified first time point to the identified second time point.

7. The travelling direction calculation apparatus according to claim 6, wherein based on the change in the vertical component of the acceleration, the period identification circuitry identifies a time point when a heel of a foot of the user lands on ground as the first time point and identifies a time point when a toe of the foot of the user lands on the ground as the second time point.

8. The travelling direction calculation apparatus according to claim 6,
wherein based on the change in the vertical component of the acceleration, the period identification circuitry identifies a time point when a heel of a first foot of the user lands on ground as the first time point and identifies a time point when a heel of a second foot of the user floats as the second time point.

9. The travelling direction calculation apparatus according to claim 1, further comprising:
a magnetic field sensor; and
a coordinate system converter that performs conversion of a coordinate system for the acceleration detected by the acceleration sensor to a coordinate system including two axes respectively extending vertically and horizontally, the conversion being performed based on a direction of a magnetic field detected by the magnetic field sensor,
wherein the period identification circuitry identifies the stable measurement period based on the vertical component of the acceleration in the coordinate system resulting from the conversion performed by the coordinate system converter.

10. The travelling direction calculation apparatus according to claim 9, further comprising:
a gyro sensor,
wherein the coordinate system converter performs the conversion of the coordinate system for the acceleration detected by the acceleration sensor to the coordinate system including the two axes respectively extending vertically and horizontally, the conversion being performed further based on a rotation angle detected by the gyro sensor, and
wherein the period identification circuitry identifies the stable measurement period based on the vertical component of the acceleration in the coordinate system resulting from the conversion performed by the coordinate system converter.

11. A travelling direction decision method performed by a travelling direction calculation apparatus including an acceleration sensor that detects acceleration in three axial directions occurring on a user, the method comprising:
period identifying in which a stable measurement period and an idling leg period are identified based on a change in a vertical component of the acceleration detected by the acceleration sensor;
action determining in which walking and running are discriminated, wherein when the vertical component of the acceleration of the idling leg period at a bottom has a positive value, the action is determined as walking, and when the vertical component of the acceleration of the idling leg period at the bottom has a negative value, the action is determined as running;
vector calculating in which a velocity vector is calculated from a horizontal component of the acceleration in the stable measurement period; and
travelling direction deciding in which a direction of travelling of the user is decided based on a result of determination performed in the action determining and the velocity vector calculated in the vector calculating.

12. The travelling direction decision method according to claim 11, further comprising:
coordinate system converting in which conversion of a coordinate system for the acceleration detected by the acceleration sensor to a coordinate system including two axes respectively extending vertically and horizontally is performed based on a rotation angle detected by a gyro sensor,
wherein in the period identifying, the stable measurement period is identified based on the vertical component of the acceleration in the coordinate system resulting from the conversion performed in the coordinate system converting.

13. The travelling direction decision method according to claim 11,
wherein in the travelling direction deciding, a direction identical to a direction of the velocity vector is decided for the walking, and a direction opposite to the direction of the velocity vector is decided for the running.

14. The travelling direction decision method according to claim 11, wherein in the vector calculating, the velocity vector is calculated by integrating the horizontal component of the acceleration in the stable measurement period.

15. The travelling direction decision method according to claim 11, further comprising:
coordinate system converting in which conversion of a coordinate system for the acceleration detected by the acceleration sensor to a coordinate system including two axes respectively extending vertically and horizontally is performed based on a direction of a magnetic field detected by a magnetic field sensor,
wherein in the period identifying, the stable measurement period is identified based on the vertical component of the acceleration in the coordinate system resulting from the conversion performed in the coordinate system converting.

16. The travelling direction decision method according to claim 15,
wherein in the coordinate system converting,
the conversion of the coordinate system for the acceleration detected by the acceleration sensor to the coordinate system including the two axes respectively extending vertically and horizontally is performed further based on a rotation angle detected by a gyro sensor, and
wherein in the period identifying,
the stable measurement period is identified based on the vertical component of the acceleration in the coordinate system resulting from the conversion performed in the coordinate system converting.

17. The travelling direction decision method according to claim 11,
wherein in the period identifying, a time point when the vertical component of the acceleration takes on a first maximum value is identified as a first time point, a time point when the vertical component of the acceleration takes on a second maximum value is identified as a second time point, and a period from the identified first time point to the identified second time point is identified as the stable measurement period.

18. The travelling direction decision method according to claim 17,
wherein in the period identifying, based on the change in the vertical component of the acceleration, a time point when a heel of a foot of the user lands on ground is identified as the first time point, and a time point when a toe of the foot of the user lands on the ground is identified as the second time point.

19. The travelling direction decision method according to claim 17,
wherein in the period identifying, based on the change in the vertical component of the acceleration, a time point when a heel of a first foot of the user lands on ground is identified as the first time point, and a time point when a heel of a second foot of the user floats is identified as the second time point.

* * * * *